US010875534B2

(12) United States Patent
Maruyama et al.

(10) Patent No.: US 10,875,534 B2
(45) Date of Patent: Dec. 29, 2020

(54) VEHICLE CONTROL DEVICE

(71) Applicant: Hitachi Automotive Systems, Ltd., Hitachinaka (JP)

(72) Inventors: Nahoko Maruyama, Tokyo (JP); Yoichi Iihoshi, Tokyo (JP); Taisetsu Tanimichi, Hitachinaka (JP)

(73) Assignee: Hitachi Automotive Systems, Ltd., Hitachinaka (JP)

(*) Notice: Subject to any disclaimer, the term of this patent is extended or adjusted under 35 U.S.C. 154(b) by 118 days.

(21) Appl. No.: 16/096,933

(22) PCT Filed: May 12, 2017

(86) PCT No.: PCT/JP2017/018014
§ 371 (c)(1),
(2) Date: Oct. 26, 2018

(87) PCT Pub. No.: WO2017/204006
PCT Pub. Date: Nov. 30, 2017

(65) Prior Publication Data
US 2019/0100207 A1 Apr. 4, 2019

(30) Foreign Application Priority Data

May 27, 2016 (JP) ................... 2016-105758

(51) Int. Cl.
*B60W 30/18* (2012.01)
*B60W 20/30* (2016.01)
(Continued)

(52) U.S. Cl.
CPC ......... *B60W 30/18072* (2013.01); *B60K 6/48* (2013.01); *B60K 6/543* (2013.01);
(Continued)

(58) Field of Classification Search
None
See application file for complete search history.

(56) References Cited

U.S. PATENT DOCUMENTS 5,832,400 A 11/1998 Takahashi et al.
2010/0256848 A1* 10/2010 Sasaki ................ B60L 3/12
701/22
(Continued)

FOREIGN PATENT DOCUMENTS

EP 2 591 967 A2 5/2013
EP 2 738 412 A1 6/2014
(Continued)

OTHER PUBLICATIONS

Japanese-language Office Action issued in counterpart Japanese Application No. 2016-105758 dated Sep. 3, 2019 with English translation (eight pages).

(Continued)

*Primary Examiner* — Peter D Nolan
*Assistant Examiner* — Demetra R Smith-Stewart
(74) *Attorney, Agent, or Firm* — Crowell & Moring LLP

(57) ABSTRACT

The purpose of the present invention is to improve fuel efficiency during coasting by calculating, with high accuracy, travel resistance during coasting. This vehicle control device comprises: a first travel resistance acquisition unit that acquires a first travel resistance, which is determined on the basis of road information or external information; and a second travel resistance acquisition unit that acquires a second travel resistance, which is determined on the basis of the result of actual traveling of the vehicle. This vehicle control device determines the content of coasting travel control during traveling of the vehicle on the basis of the (Continued)

result of a comparison of the first travel resistance and the second travel resistance in a predetermined zone where the vehicle has actually traveled.

9 Claims, 13 Drawing Sheets

(51) Int. Cl.

| | | |
|---|---|---|
| B60W 20/15 | (2016.01) | |
| B60W 20/12 | (2016.01) | |
| B60W 10/06 | (2006.01) | |
| B60W 10/08 | (2006.01) | |
| B60W 10/10 | (2012.01) | |
| B60W 10/02 | (2006.01) | |
| B60K 6/543 | (2007.10) | |
| B60W 10/107 | (2012.01) | |
| B60W 10/04 | (2006.01) | |
| B60K 6/48 | (2007.10) | |
| B60W 40/06 | (2012.01) | |
| B60W 20/11 | (2016.01) | |

(52) U.S. Cl.
CPC ............ *B60W 10/02* (2013.01); *B60W 10/04* (2013.01); *B60W 10/06* (2013.01); *B60W 10/08* (2013.01); *B60W 10/10* (2013.01); *B60W 10/107* (2013.01); *B60W 20/11* (2016.01); *B60W 20/12* (2016.01); *B60W 20/15* (2016.01); *B60W 20/30* (2013.01); *B60W 30/18* (2013.01); *B60W 40/06* (2013.01); *B60W 2400/00* (2013.01); *B60W 2520/10* (2013.01); *B60W 2520/105* (2013.01); *B60W 2530/16* (2013.01); *B60W 2552/00* (2020.02); *B60W 2554/801* (2020.02); *B60W 2554/804* (2020.02); *B60W 2555/60* (2020.02); *B60W 2556/65* (2020.02); *B60W 2710/021* (2013.01); *B60W 2710/065* (2013.01); *B60W 2710/0627* (2013.01); *B60W 2710/08* (2013.01); *B60W 2710/1005* (2013.01); *B60W 2900/00* (2013.01); *B60Y 2200/92* (2013.01); *Y02T 10/40* (2013.01); *Y02T 10/60* (2013.01); *Y02T 10/62* (2013.01)

(56) References Cited

U.S. PATENT DOCUMENTS

| | | | |
|---|---|---|---|
| 2010/0324752 A1 | 12/2010 | Suganuma et al. | |
| 2015/0151761 A1 | 6/2015 | Suzuki et al. | |
| 2015/0158491 A1 | 6/2015 | Suzuki et al. | |
| 2015/0275800 A1* | 10/2015 | Stenlaas ................ | B60W 10/00 |
| | | | 123/676 |
| 2016/0016564 A1 | 1/2016 | Otake et al. | |
| 2016/0019792 A1* | 1/2016 | Kawamata ............. | G07C 5/085 |
| | | | 701/70 |
| 2017/0008525 A1* | 1/2017 | Ko .................. | B60W 30/18127 |
| 2018/0111615 A1* | 4/2018 | Yamakado .......... | B60W 40/105 |

FOREIGN PATENT DOCUMENTS

| | | |
|---|---|---|
| JP | 8-72591 A | 3/1996 |
| JP | 2009-236714 A | 10/2009 |
| JP | 2012-214181 A | 11/2012 |
| JP | 2012-219904 A | 11/2012 |
| JP | 2014-83895 A | 5/2014 |
| JP | 2014-84905 A | 5/2014 |
| WO | WO 2013/094045 A1 | 6/2013 |

OTHER PUBLICATIONS

Japanese-language Office Action issued in Japanese Application No. 2016-105758 dated Dec. 16, 2019 with English translation (six pages).
Extended European Search Report issued in European Application No. 17802600.1 dated Jan. 3, 2020 (nine pages).
International Search Report (PCT/ISA/210) issued in PCT Application No. PCT/JP2017/018014 dated Aug. 29, 2017 with English translation (five (5) pages).
Japanese-language Written Opinion (PCT/ISA/237) issued in PCT Application No. PCT/JP2017/018014 dated Aug. 29, 2017 (five (5) pages).

* cited by examiner

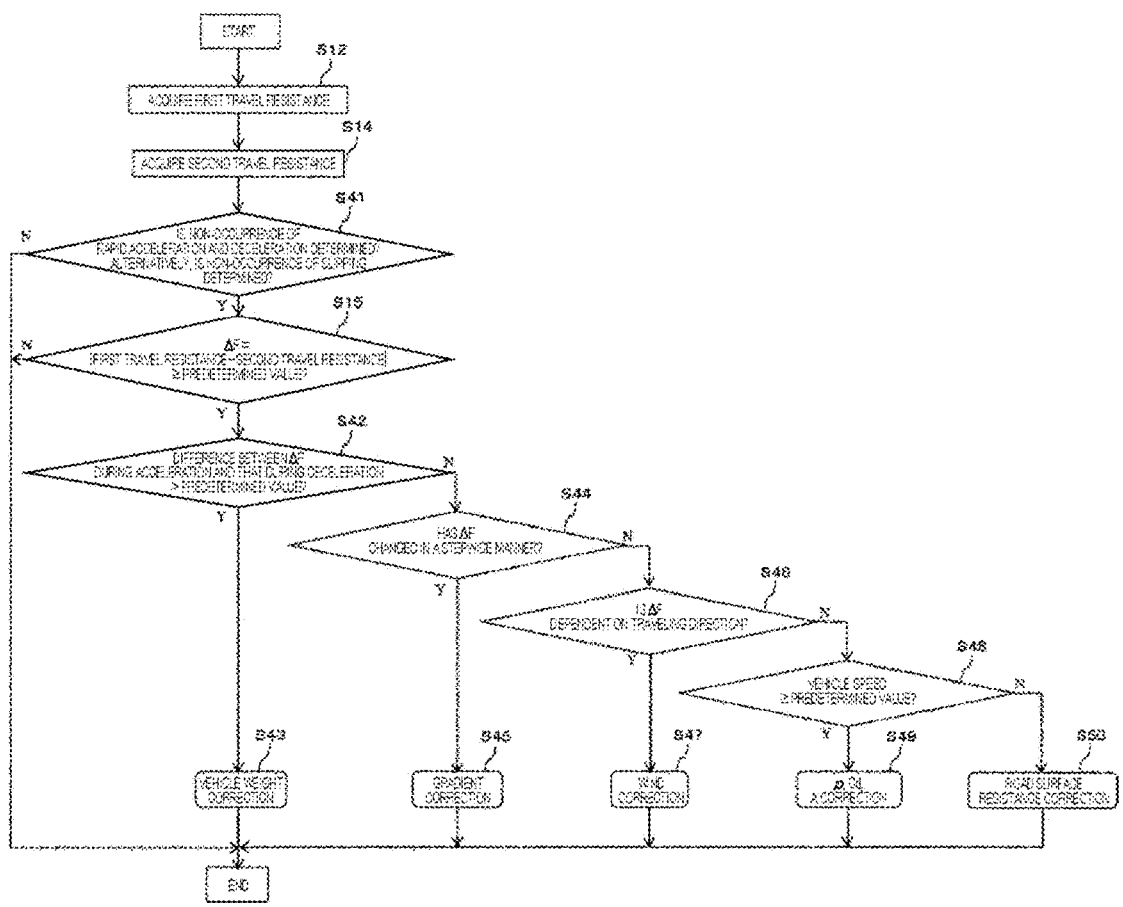

FIG. 14

| | RECORDING DESTINATION | FREQUENCY OF UPDATE DURING SINGLE TRIP | RECORDING PERIOD |
|---|---|---|---|
| VEHICLE WEIGHT, AIR RESISTANCE COEFFICIENT (ρ, Cd, A), ROAD SURFACE RESISTANCE COEFFICIENT (DIFFERENCE IMMEDIATELY AFTER STARTING TRAVELING) | VEHICLE PARAMETER | LOW | UNTIL NEXT START OF TRAVELING (INCLUDING TURNING ON IGNITION SWITCH) |
| GRADIENT, ROAD SURFACE RESISTANCE COEFFICIENT (CHANGE DURING TRAVELING) | MAP | MEDIUM | UNTIL NEXT TRAVELING IN SAME PLACE |
| WIND | TEMPORARY DATA | HIGH | WITHIN PREDETERMINED PERIOD OF TIME |

FIG. 15

|  | | ACCELERATION | | COASTING TRAVEL CONTROL | |
|---|---|---|---|---|---|
|  | | EASY | DIFFICULT | | |
| DECELERATION | EASY | VEHICLE WEIGHT: LIGHT | GRADIENT: RISING<br>WIND: HEAD WIND<br>AIR RESISTANCE COEFFICIENT: HIGH<br>ROLLING RESISTANCE COEFFICIENT: HIGH | SUITABLE COASTING TRAVEL MODE | CLUTCH DISENGAGED ≥ ENGINE BRAKE | START OF COASTING | TO BE DELAYED |
| | DIFFICULT | GRADIENT: FALLING<br>WIND: FOLLOWING WIND<br>AIR RESISTANCE COEFFICIENT: LOW<br>ROLLING RESISTANCE COEFFICIENT: LOW | VEHICLE WEIGHT: HEAVY | | CLUTCH DISENGAGED ≤ ENGINE BRAKE | | TO BE ADVANCED |
| COASTING TRAVEL CONTROL | | PRELIMINARY START-UP | | | |
| | | UNNECESSARY | NECESSARY | | |
| | | END OF COASTING | | | |
| | | TO BE DELAYED | TO BE ADVANCED | | |

FIG. 16

VEHICLE CONTROL DEVICE

TECHNICAL FIELD

The present invention relates to a control device for an automobile, and more particularly to a control device for an automobile having an automatic stop or restart function for automatically stopping and restarting an engine.

BACKGROUND ART

In order to improve fuel efficiency and drivability, technology for acquiring information on, for example, a road shape of a road ahead, and controlling an engine and a transmission is expanding. PTL 1 discloses a technique of calculating necessary driving force on the basis of information acquired from a map, and calculating power consumption at the time of operating a motor at optimum efficiency.

In addition, PTL 2 discloses a technique of estimating current travel resistance, and utilizing the current travel resistance for predicting travel resistance of a road ahead so as to more accurately predict necessary engine driving force.

Meanwhile, PTL 3 discloses a technique of discontinuing an engine stopped state in the case of a steep gradient, which is implemented in relation to the following control (hereinafter referred to as engine stop/coasting travel control). In order to improve fuel efficiency, when a predetermined condition is satisfied during traveling, an engine is temporarily stopped, and a clutch interposed between an automatic transmission and the engine is disengaged to cause an automobile to coast. Subsequently, when the predetermined condition is satisfied, the engine is restarted, and the clutch is engaged again. This improves fuel efficiency by causing an automobile to coast with its clutch disengaged during traveling, and also ensures drivability by improving response in a situation where driving force is considered necessary.

CITATION LIST

Patent Literature

PTL 1: WO 13/094045
PTL 2: JP 8-072591 A
PTL 3: JP 2014-84905 A

SUMMARY OF INVENTION

Technical Problem

However, in the conventional techniques, sufficient consideration is not given to travel resistance during coasting. Thus, it is impossible to start coasting at an appropriate position with respect to, for example, an object requiring deceleration such as an intersection ahead, and unnecessary drive output is thus provided. Accordingly, there is a risk of not achieving an effect on fuel efficiency which is supposed to be achieved.

For example, in the method of PTL 1, in order to calculate travel resistance, gradient resistance and air resistance are predicted by use of a gradient and a road shape obtained from a map or own vehicle speed predicted from past traveling data of an own vehicle. Resistance other than the above is treated as known. In addition, when actual vehicle speed deviates from the prediction, travel resistance cannot be estimated with high accuracy.

In the method of PTL 2, travel resistance is predicted on the premise that prediction is performed without involving any changes in rolling resistance, air resistance and acceleration resistance. Thus, sufficient consideration is not given to changes in acceleration resistance and air resistance involved in performing coasting.

PTL 3 describes termination conditions of engine stop coasting. However, there is no mention of the start thereof. Thus, it can be said that there is room for further improvement of fuel efficiency.

As described above, with respect to a vehicle capable of disengaging and re-engaging a clutch even during traveling under predetermined conditions, the acceleration of the vehicle during coasting with the clutch disengaged depends greatly on travel resistance. Unless coasting is started after estimating travel resistance of a road to travel thereafter, for a long distance with high accuracy, an effect on fuel efficiency which is supposed to be achieved cannot be achieved in some cases.

Therefore, an object of the present invention is to improve fuel efficiency due to coasting by calculating, with high accuracy, travel resistance during coasting.

Solution to Problem

The present invention includes: a first travel resistance acquisition unit that acquires a first travel resistance, which is determined on the basis of road information or external information; and a second travel resistance acquisition unit that acquires a second travel resistance, which is determined on the basis of the result of actual traveling of the vehicle. The content of coasting travel control during traveling on the road ahead is determined on the basis of the result of a comparison of the first travel resistance and the second travel resistance in a predetermined zone where the vehicle has actually traveled.

Advantageous Effects of Invention

According to the present invention, travel resistance during coasting is calculated with high accuracy, and coasting travel control is changed on the basis of the calculation. This improves fuel efficiency due to coasting accordingly.

BRIEF DESCRIPTION OF DRAWINGS

FIG. 14 is a flowchart showing a method of estimating travel resistance in a sixth embodiment.

FIG. 15 is a table showing recording methods of the estimation results of travel resistance in the sixth embodiment.

FIG. 16 is a table showing a method of selecting coasting travel control according to the result of adjustment of travel resistance in the sixth embodiment.

DESCRIPTION OF EMBODIMENTS

Next, embodiments of the present invention will be described in detail with reference to the drawings. However, the present invention is not limited to the following embodiments, and various modifications and application examples made within the technical concept of the present invention are also included in the scope of the present invention.

First Embodiment

Figure 1:
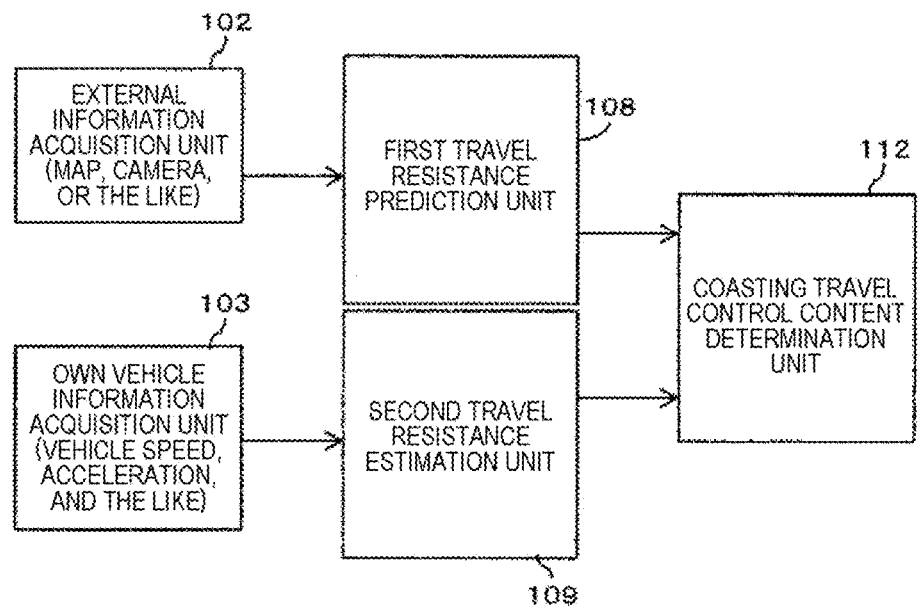
FIG. 1 is an example of a block diagram for implementing a vehicle control device according to an embodiment of the present invention.

FIG. 1 is an example of a control block diagram for implementing a vehicle control device according to an embodiment of the present invention. The vehicle control device includes an external information acquisition unit 102, a first travel resistance prediction unit (first travel resistance acquisition unit) 108, an own vehicle information acquisition unit 103, a second travel resistance estimation unit (second travel resistance acquisition unit) 109, and a coasting travel control content determination unit 112. The external information acquisition unit 102 acquires information on, for example, intersections and curves of roads, gradients, and limited vehicle speed, from a map or an external sensor such as a camera. The first travel resistance prediction unit 108 calculates a first travel resistance as a result of predicting travel resistance ahead, on the basis of the information. The own vehicle information acquisition unit 103 acquires information on, for example, the vehicle speed of an own vehicle, and the states of a clutch and a transmission. The second travel resistance estimation unit 109 estimates travel resistance to which the own vehicle is actually subjected, on the basis of the information of the own vehicle information acquisition unit 103. The coasting travel control content determination unit 112 determines the content of coasting travel control on the basis of the value of the first travel resistance and the value of the second travel resistance. With the configuration, it is possible to predict travel resistance of a road on which the own vehicle has not yet traveled, in accordance with a current travel environment (own vehicle conditions, road surface conditions, and the like).

Figure 2:
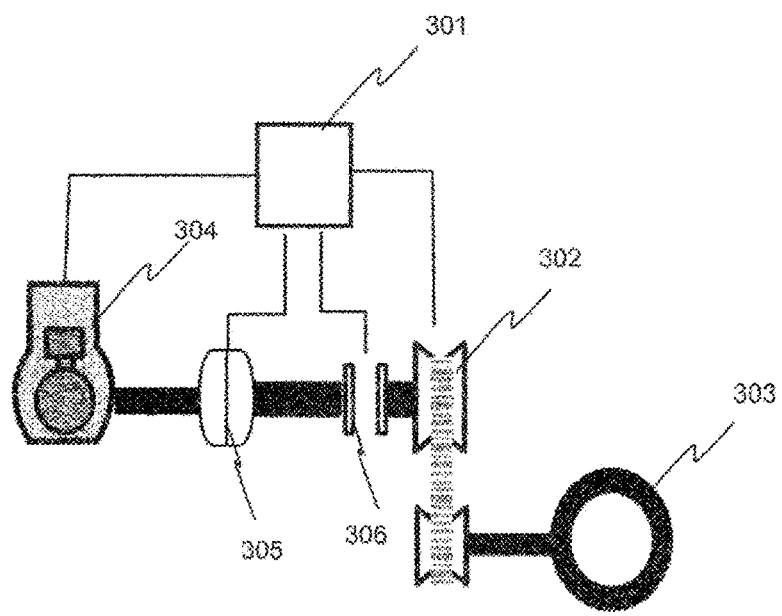
FIG. 2 shows a schematic configuration of a drive system of an automobile on which the vehicle control device according to the embodiment of the present invention is mounted.

FIG. 2 shows a schematic configuration of a drive system of an automobile. The drive system includes an engine 304 as a power source for traveling, a torque converter 305 for adjusting the rotational force of the engine 304 by a speed change mechanism, a clutch 306, an automatic transmission 302, a control device 301 for controlling them, and a driving wheel 303 to be driven by driving force transmitted from the automatic transmission 302. It should be noted that in addition to the above, the vehicle also includes a brake device (not shown), an external world recognition device, and a communication device.

One or more of a laser radar, a millimeter wave radar, a monocular camera, a stereo camera, and the like may be used in combination as the external world recognition device. In addition, the communication device communicates with a roadside communication device or another vehicle to acquire information on a road and travel resistance of the another vehicle.

Figure 3:
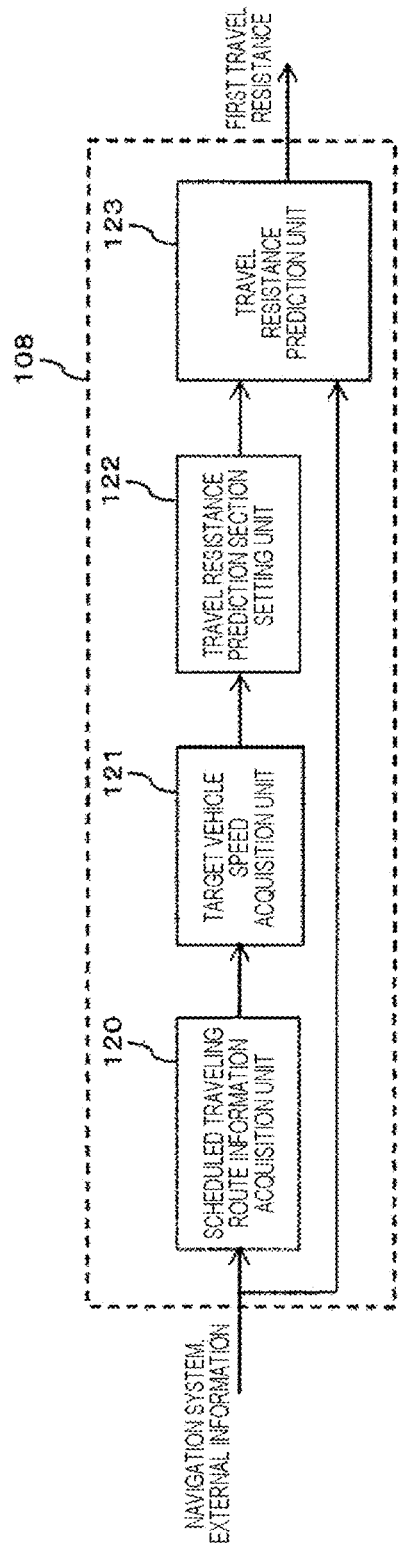
FIG. 3 is a diagram showing the internal configuration of a first travel resistance prediction unit shown in FIG. 1.

FIG. 3 is an example of a block diagram of the first travel resistance prediction unit 108. The first travel resistance prediction unit 108 includes a scheduled traveling route acquisition unit 120, a target vehicle speed acquisition unit 121, a travel resistance prediction section setting unit 122, and a travel resistance prediction unit 123. The scheduled traveling route acquisition unit 120 predicts a scheduled traveling route on the basis of the shape of a road ahead as to, for example, whether an intersection exists. The target vehicle speed acquisition unit 121 acquires a target vehicle speed on the scheduled traveling route on the basis of information about a speed limit on the scheduled traveling route and planimetric features requiring speed reduction (hereinafter referred to as planimetric features requiring deceleration), such as a stop sign, a curve, and a red light. The travel resistance prediction section setting unit 122 defines a minimum section for predicting travel resistance. The travel resistance prediction unit 123 predicts travel resistance on the basis of information on, for example, the gradient of the travel resistance prediction section.

Figure 4:
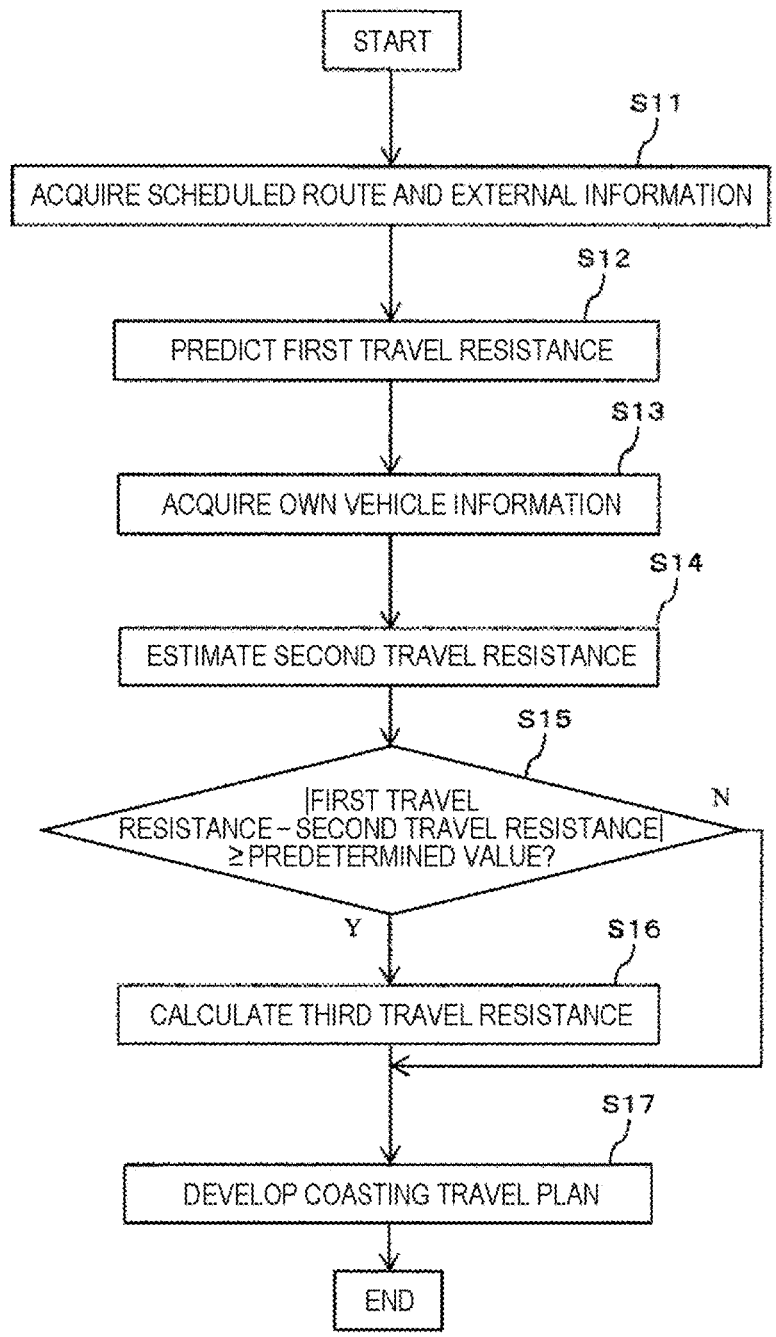
FIG. 4 is a representative flowchart of the vehicle control device according to the embodiment of the present invention.

FIG. 4 shows a flowchart of the present embodiment. In S11, a scheduled traveling route and information on the scheduled traveling route are acquired. The information includes road shapes acquired from a map and the external sensor. When there is an intersection on a road, the course of the own vehicle after passing the intersection may be predicted with reference to a turn signal or a route set in a navigation system, or may be predicted from a driver's usual traveling route. External information concerning the scheduled traveling route is acquired. Examples of the external information include a gradient, a traffic light, a stop sign, a curve, and a positional/speed relationship with another vehicle.

In S12, the first travel resistance is calculated from the external information acquired in S11. The first travel resistance is a predicted value of travel resistance ahead. Examples of information to be used for predicting the first travel resistance include information on gradients, curve curvature, and roughness of a road surface, acquired from the map, and information on gradients, curvature, and road surface covering material, acquired from the external sensor. In S13, own vehicle information is acquired. The own vehicle information includes own vehicle speed, the value of a torque sensor, acceleration, a tire radius, and a gear ratio. In S14, the second travel resistance is calculated from the own vehicle information. The second travel resistance is an estimated value of travel resistance at the current position of the own vehicle. It should be noted that the prediction section of travel resistance is set in a manner to include one or more planimetric features requiring deceleration.

In S15, a difference between the first travel resistance and the second travel resistance is calculated. When the difference is equal to or larger than a predetermined value, the content of coasting travel control is changed according to the difference. Specifically, the start position and end position of coasting are changed.

Figure 5:
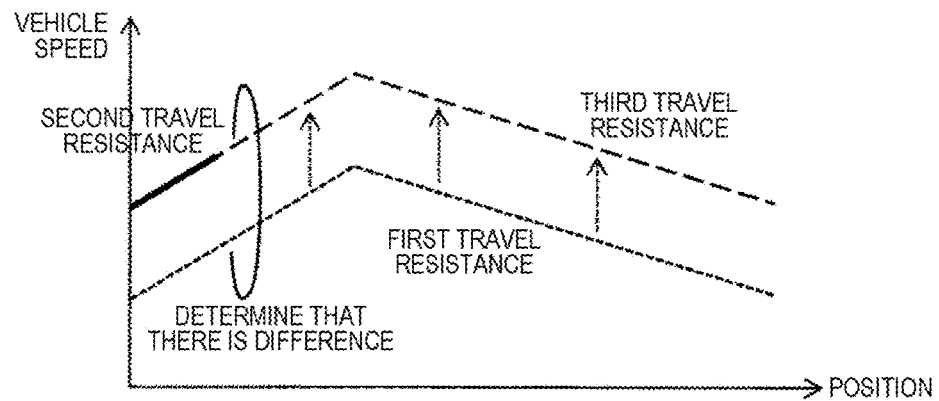
FIG. 5 shows an example of a method of calculating a third travel resistance.
Figure 5:
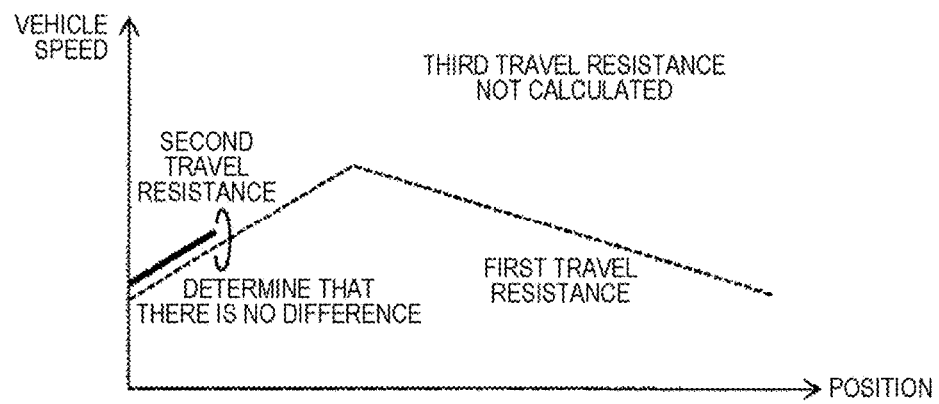

The coasting travel start position and end position are determined as follows. For example, the location of a planimetric feature requiring deceleration is defined as the end position. An own vehicle speed is calculated backward on the assumption that at the position, the own vehicle speed reaches a target vehicle speed set according to the type of planimetric feature. A point at which the own vehicle speed calculated backward intersects with the current own vehicle speed is defined as the start position (FIG. 5). Then, as the second travel resistance gets smaller than the first travel resistance, coasting is started at an earlier point. Furthermore, in the case where the target vehicle speed at the end position of coasting is greater than 0 km/h, and is accelerated thereafter, the end of coasting is delayed. When the second travel resistance is larger than the first travel resistance, the start of coasting is delayed, and the coasting is ended earlier. It should be noted that for example, the target vehicle speed is set to 0 km/h for a stop sign or red light, and set to a lower vehicle speed as the curvature of a curve gets smaller.

When the difference is equal to or less than the predetermined value, a coasting travel plan developed in S15 is output, and the process is terminated.

As described above, the first travel resistance is calculated from the information acquired from the map and the like before traveling, and the second travel resistance is calculated from the information acquired at the time of traveling. On the basis of the first travel resistance and the second travel resistance, the subsequent content of coasting travel control is determined.

Figure 6:
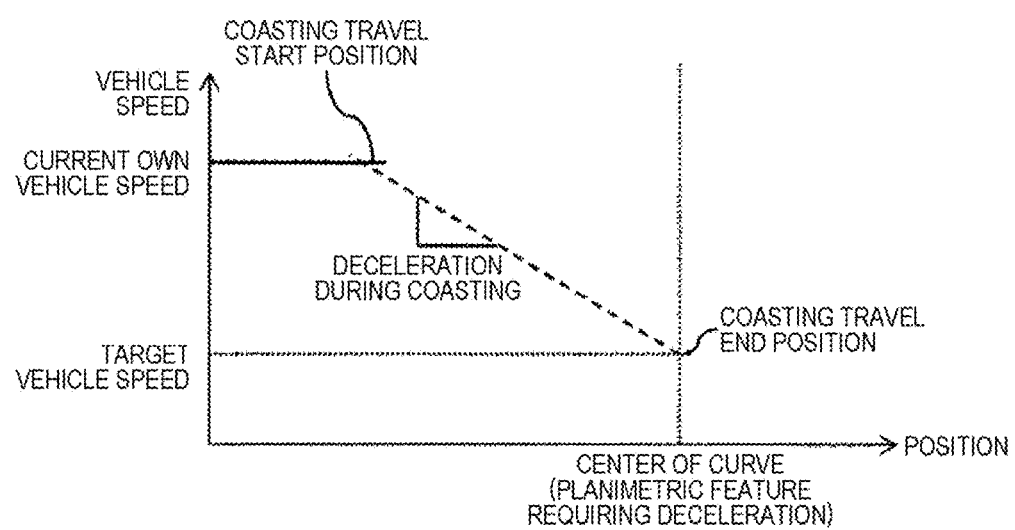
FIG. 6 shows an example of a method of defining a coasting travel starting point.

With the present configuration, when the second travel resistance (actual travel resistance) is smaller than the first travel resistance (predicted travel resistance), it is possible to start coasting earlier accordingly, as shown in FIG. 6. Thus, fuel efficiency is improved. Moreover, it is possible to end coasting and start acceleration in consideration of ease and difficulty of acceleration due to changes in travel resistance. Therefore, it is possible to avoid wastefully starting acceleration at an early stage or increasing acceleration for correcting the vehicle speed so as to achieve the target vehicle speed when requested acceleration cannot be attained. This also contributes to improving fuel efficiency.

Second Embodiment

A method of determining the start and end positions of coasting by utilizing a target vehicle speed on a scheduled traveling route will be described.

Figure 7:
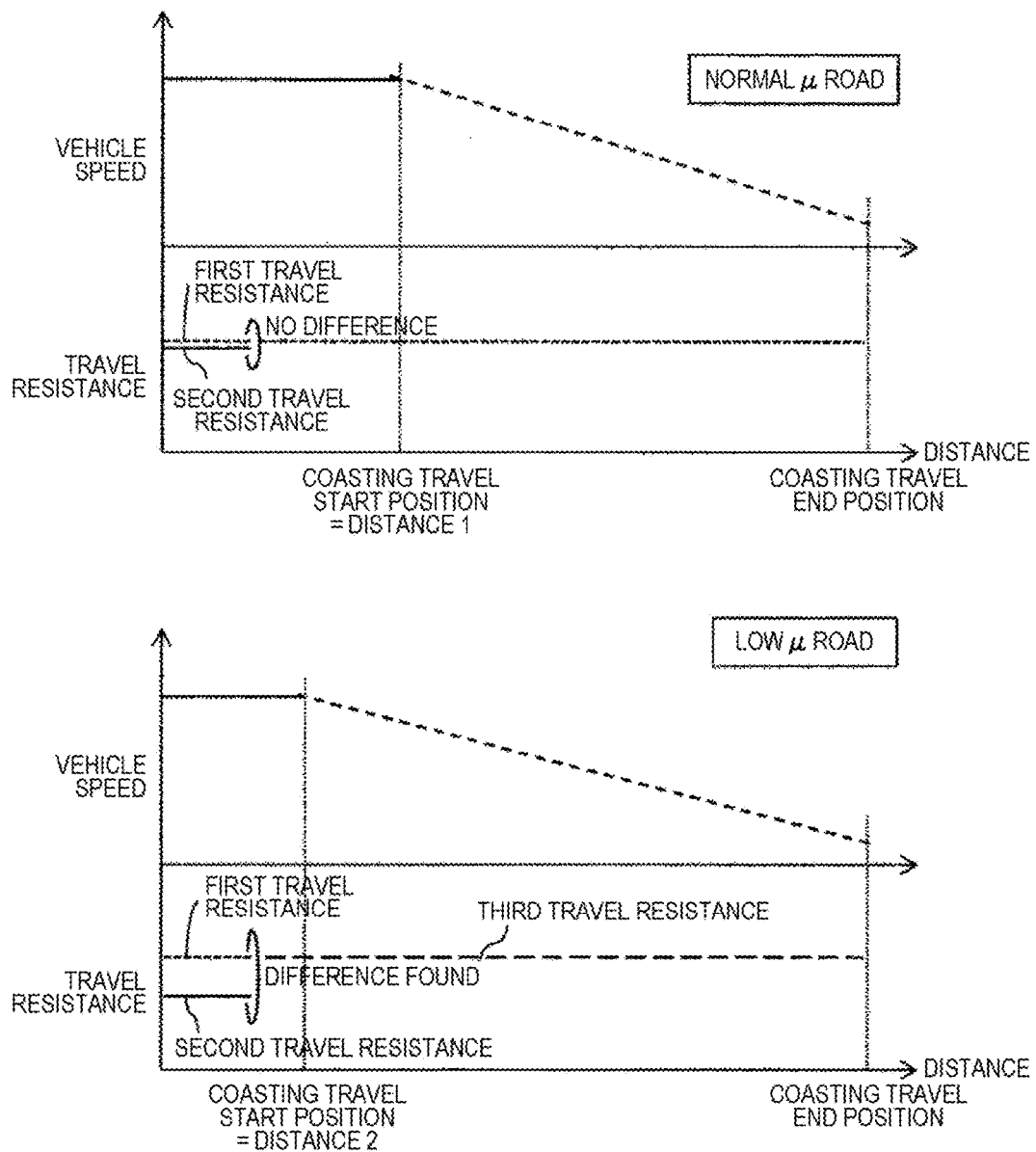
FIG. 7 shows an example of details of determination of coasting travel control in the case where second travel resistance is smaller than first travel resistance.

FIG. 7 shows a flowchart of the present embodiment. After acquiring information on a scheduled traveling route in S11, a target vehicle speed on the scheduled traveling route is acquired in S21. The target vehicle speed is determined with reference to, for example, the average speed of another vehicle or a vehicle speed set by the ACC or the like of a driver, in addition to the speed limit on a scheduled traveling route and information on planimetric features requiring deceleration, referred to in the first embodiment. The lowest vehicle speed among those in the acquired information is defined as a target vehicle speed. It should be noted that a distance to a preceding vehicle, and differences in speed and acceleration from the preceding vehicle are also reflected in calculation of a target vehicle speed for the latest several seconds so as to create a target vehicle speed without a risk of a collision with the preceding vehicle.

Subsequently, a minimum section for predicting a first travel resistance is set in S22. The nearest position at which the target vehicle speed has a minimum value and the target vehicle speed at that time are acquired. Coasting is started from the target vehicle speed minimum position at the target vehicle speed. A section from the target vehicle speed minimum position to the position, at which the vehicle speed is expected to be zero, is defined as a coasting travel plan section. As a result, it is possible to more accurately calculate the estimated start position and the estimated end position of coasting for maximizing coasting travel duration time in the procedure shown in FIG. 8 to be described below.

In addition, a target lower limit vehicle speed in the section is set. The target lower limit speed is set to, for example, 95% of the target vehicle speed, or a value obtained by subtracting 5 km/h or 10 km/h from the target vehicle speed.

In S12 to S14, processing similar to that in the first embodiment is performed.

In S23, a coasting travel plan within the section set in S22 is developed.

Figure 8:
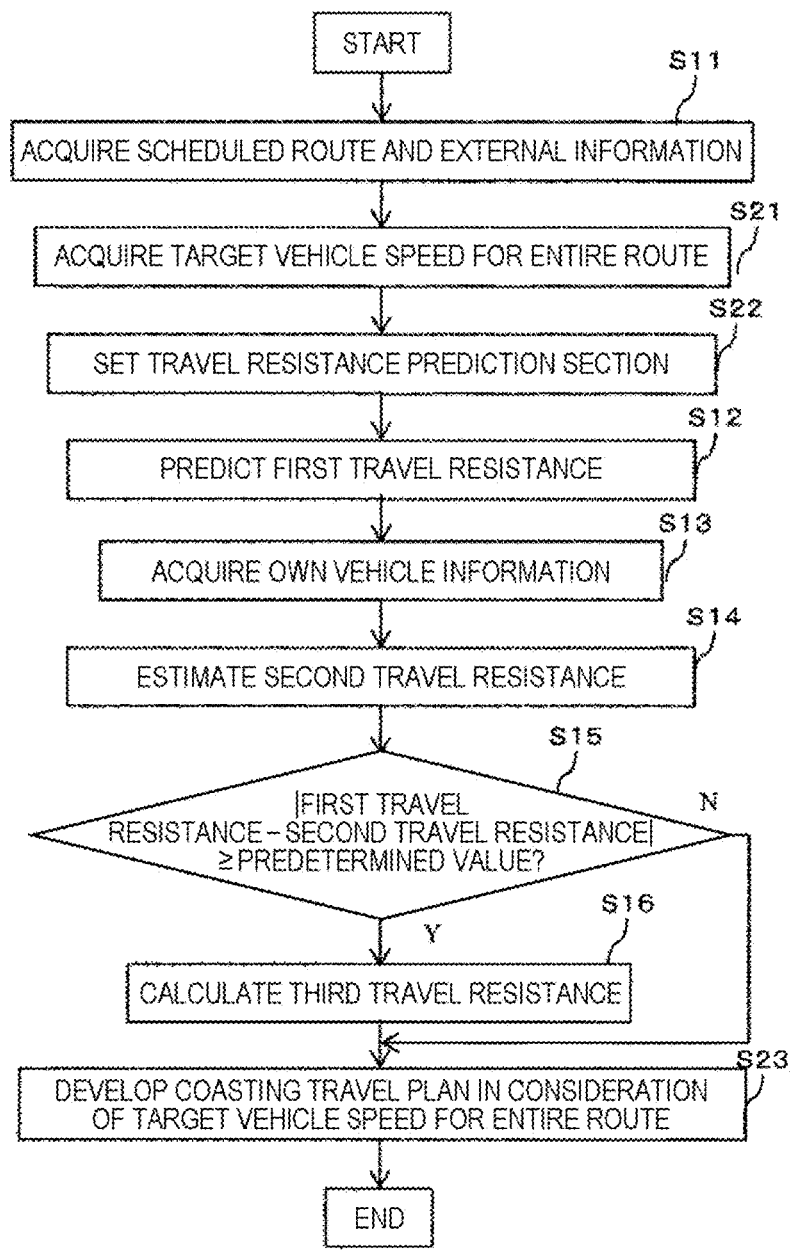
FIG. 8 is a chart showing a coasting travel planning flow in a second embodiment.
Figure 9:
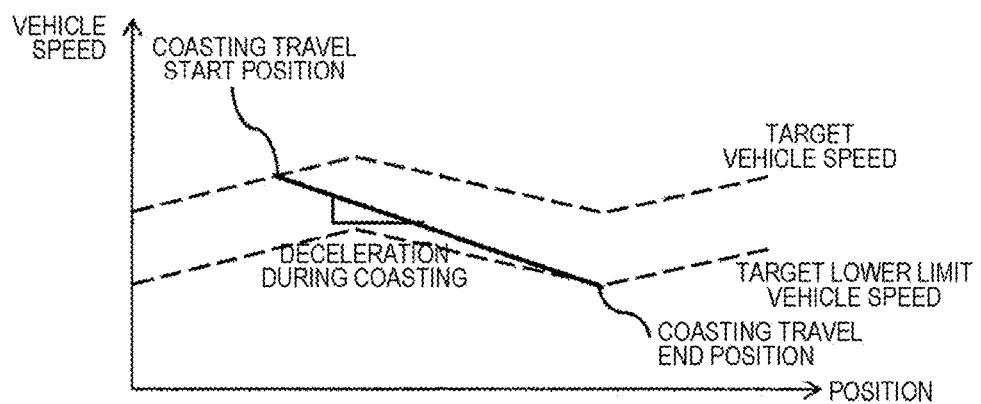
FIG. 9 shows an example of a method of determining a coasting travel end position in the second embodiment.
Figure 10:
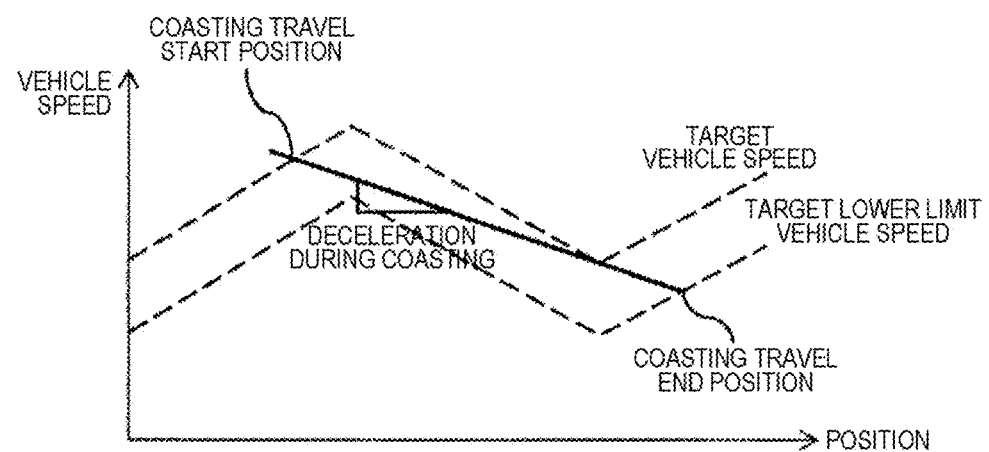
FIG. 10 shows an example of the method of determining a coasting travel end position in the second embodiment, the example being different from that shown in FIG. 9.

A process for determining the start and end positions of coasting will be described with reference to FIGS. 8, 9, and 10.

For example, the estimated end position is defined as a position at which the target vehicle speed has the minimum value. The estimated start position is defined as a position at which the locus of an own vehicle speed intersects with that of a coasting travel vehicle speed (FIG. 8), on the assumption that at the estimated end position, the own vehicle speed falls within a range from the target lower limit vehicle speed to the target vehicle speed, and that coasting continues to the position. It should be noted that when the own vehicle speed has a value higher than the target lower limit speed at the target vehicle speed minimum position, it is not always necessary to terminate coasting at the target vehicle speed minimum position. The coasting can be continued until the coasting travel vehicle speed intersects with the target vehicle speed or the target lower limit speed, and braking or further generation of driving force is needed (FIG. 9).

Alternatively, the coasting travel end position is not fixed to the position at which the target vehicle speed is minimized in the relevant section. Instead, in view of a balance between the acceleration of the target vehicle speed and travel resistance, the start point and end point of coasting are adopted in a manner to maximize elapsed time until the own vehicle speed intersects with either the target vehicle speed or the target lower limit vehicle speed, and coasting is terminated (braking or further acceleration is performed) (FIG. 10).

With regard to the coasting mode, calculation of the above-described estimated start position and estimated end position is performed for each of two patterns of traveling with a clutch disengaged and traveling with an engine brake in use. In the case where traveling with a clutch disengaged enables longer coasting, engine stop coasting is selected. Meanwhile, in the case where traveling with an engine brake in use enables longer coasting, engine brake traveling is selected.

S16 and S17 are performed in a manner similar to that in the first embodiment.

With the present configuration, it is possible to select vehicle behavior that effectively improves fuel efficiency in accordance with travel resistance ahead.

Third Embodiment

A method of calculating third travel resistance from first travel resistance and second travel resistance, and using the third travel resistance for control in the first embodiment will be described.

Figure 11:
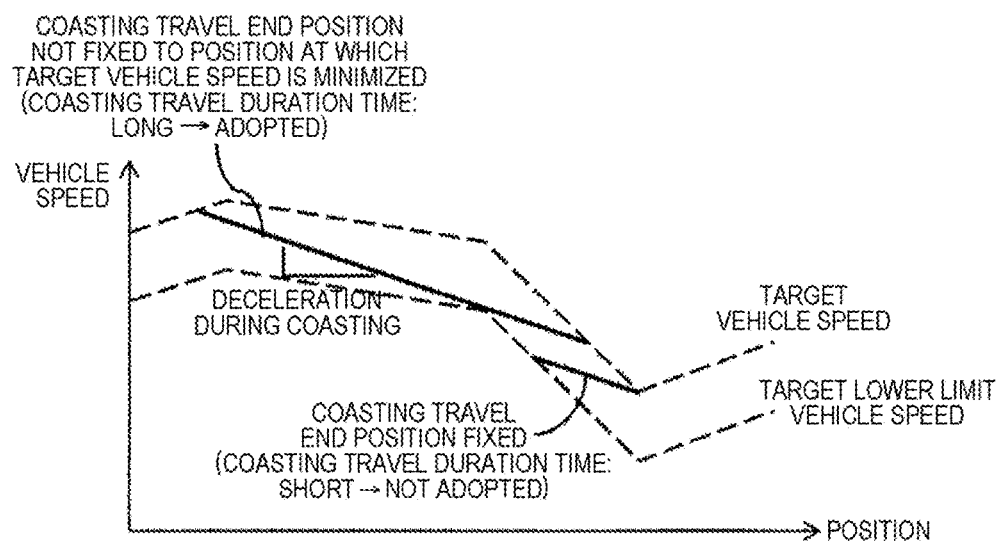
FIG. 11 shows still another example of the method of determining a coasting travel end position in the second embodiment.

In order to calculate the third travel resistance, a difference from the second travel resistance is added to the entire first travel resistance in a section (FIG. 11). It should be noted that equally adding a current difference under any circumstances may cause variation in a predicted value due to an influence of sensor accuracy and the like. Therefore, a difference is added after being weighted so as to smooth variation, as follows.

$$(\alpha<1)\Delta aplus=\Delta anow \times \alpha + \Delta aplus \times (1-\alpha) \quad \text{(Equation 1)}$$

Furthermore, in addition to assigning time weight, a value to be added is calculated while a larger weight is assigned, in the case of a value acquired during coasting, especially a value acquired while a clutch is released. That is, $$\Delta aplus=\Delta anow \times \alpha \times \beta + \Delta aplus \times (1-\alpha) \quad \text{(Equation 2)}$$

where $\beta$ is a coefficient that varies depending on a clutch state, and is set such that $\beta$ is larger during release of a clutch than during engagement of a clutch.

With the present configuration, predicted values are less likely to be affected by sensor accuracy and the like. Thus, predicted values become less likely to vary. In addition, travel resistance can be evaluated with high accuracy without any estimation errors of engine torque or engine friction while the clutch is released. Accordingly, it is possible to improve the accuracy of predicting travel resistance.

Fourth Embodiment

Figure 12:
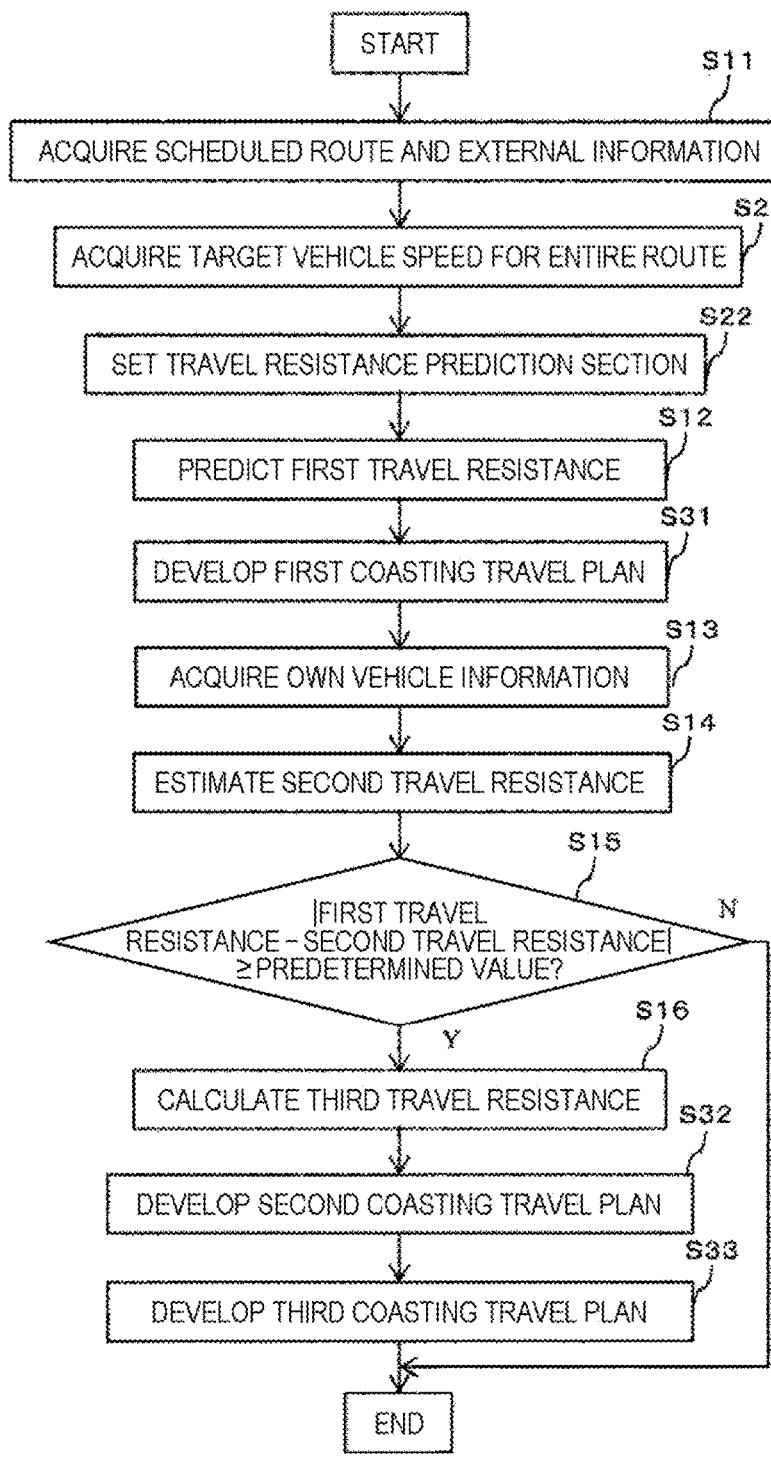
FIG. 12 is a flowchart of a method of developing a third coasting travel plan in accordance with a difference between a first coasting travel plan and a second coasting travel plan in a third embodiment.

Described below with reference to FIG. 12 is a method of developing a third coasting travel plan according to a difference between a first coasting travel plan and a second coasting travel plan, and preventing a situation where fuel efficiency cannot be effectively improved due to the difference between the coasting travel plans.

After proceeding in the same manner as in the second embodiment until S12, the first coasting travel plan is developed on the basis of first travel resistance in S31. Details of the planning method are the same as those in S23. After that, the process proceeds from S13 to S16 in the same manner as in the second embodiment. Then, the second coasting travel plan is developed on the basis of third travel resistance in S32.

Figure 13A:
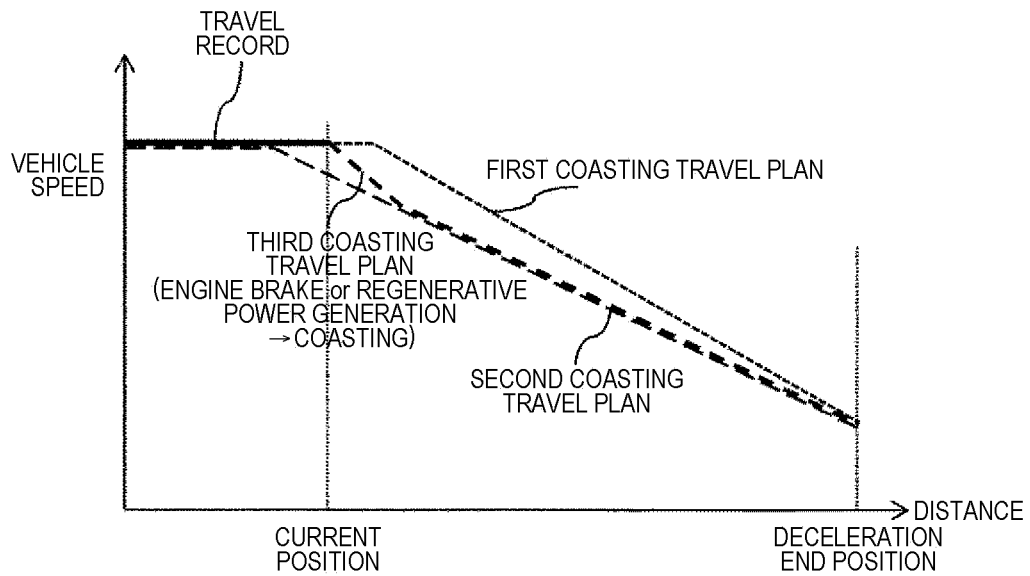
FIG. 13A shows an example of a method of creating a third coasting travel control plan in the third embodiment.
Figure 13B:
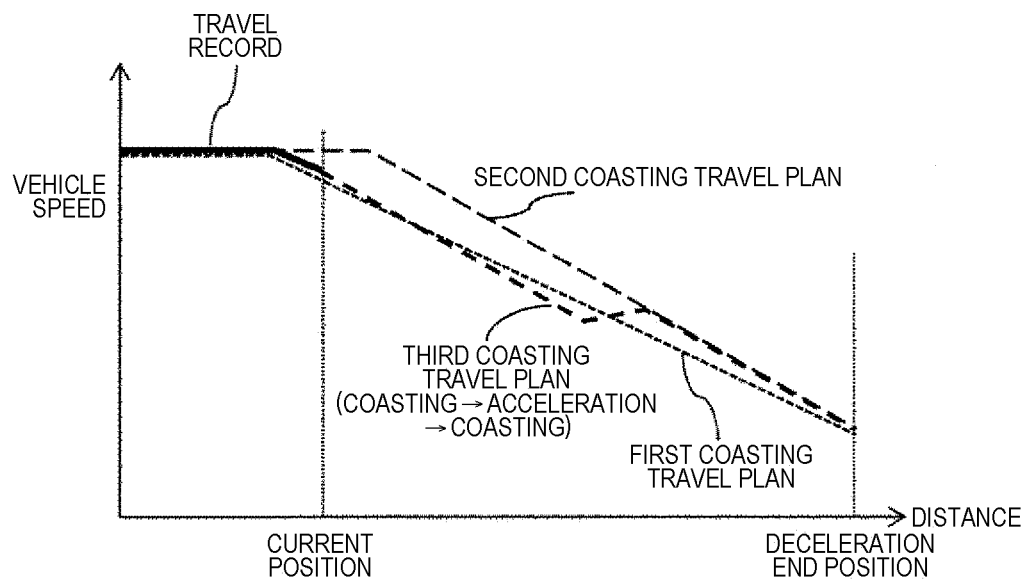
FIG. 13B shows another example of a method of creating the third coasting travel control plan in the third embodiment.

In S33, the first and second coasting travel control plans are compared to develop the third coasting travel control plan. FIGS. 13(a) and 13(b) show examples of the third coasting travel control plan.

FIG. 13(a) shows a case where, while an own vehicle is traveling by driving its engine in accordance with the first coasting travel plan, it is determined, in the second coasting travel plan, that the own vehicle should have started engine stop coasting before reaching the current position of the own vehicle. At this time, if the engine stop coasting is started from the current position, braking is required for an object requiring deceleration. Therefore, as the third coasting travel plan, engine brake traveling is performed first, and when own vehicle speed agrees with a vehicle speed profile of the second coasting travel plan, engine stop coasting is performed. Alternatively, in the case of a vehicle configured to be capable of regenerative power generation, deceleration is performed first, in a regenerative state, and when the own vehicle speed agrees with the vehicle speed profile of the second coasting travel plan, engine stop coasting is performed.

FIG. 13(b) shows a case where, while the own vehicle is coasting with its engine stopped in accordance with the first coasting travel plan, it is determined, in the second coasting travel plan, that the own vehicle should have continued traveling by driving its engine to the point beyond the current position of the own vehicle before starting coasting. In this case, the third coasting travel plan is created to the following effect. After continuing coasting until a target lower limit speed is attained, the engine is driven at a maximum efficiency point. Then, acceleration is performed until the own vehicle speed agrees with the vehicle speed profile of the second coasting travel plan, and engine stop coasting is started again.

With the configuration, even in the case where the own vehicle speed does not match the second coasting travel plan at the time of switching the coasting travel plans, it is possible to create a travel plan with the best fuel efficiency in that situation.

The vehicle is controlled on the basis of the third coasting travel plan developed by the above method. It should be noted that if it is determined, in S15, that the difference between the first travel resistance and the second travel resistance is smaller than a predetermined value, the vehicle is controlled on the basis of the first coasting travel plan.

Fifth Embodiment

Assume that a driver actively controls acceleration and deceleration, and specifically, that vehicle speed is controlled by use of an accelerator pedal or a brake pedal without using the automatic acceleration/deceleration function of the ACC or the like. In such a case, when it is recommended to start coasting in a coasting travel control plan, the driver is provided with notification to that effect via an HMI. It is possible to adopt the following notification methods. The notification may be displayed on a center screen of a navigation system or the like, or may be displayed on an instrument panel. Alternatively, the notification may be provided by voice, or may be displayed on an AI screen. It is also possible to adopt a method of, for example, increasing pedal reaction force.

With the configuration, even when the driver himself is driving, fuel efficiency can be improved by use of the prediction result of travel resistance.

Sixth Embodiment

Still another method of calculating third travel resistance and a method of controlling coasting in accordance with the calculation result will be described. Main factors for fluctuations in travel resistance include air resistance, rolling resistance, gradient resistance, and acceleration resistance. Among them, acceleration resistance can be roughly estimated from the characteristics of a vehicle. However, other factors vary depending on the environment, vehicle weight, and the like. The respective factors vary in different manners. Therefore, the respective factors are estimated in accordance with the flowchart shown in FIG. 14. The estimation results of the respective factors are stored by the methods shown in FIG. 15.

After calculating first travel resistance in S12 and second travel resistance in S14, it is first determined, in S41, whether a vehicle has rapidly accelerated or slipped. If neither rapid acceleration nor slipping has occurred, the process proceeds to S15, and ΔF which is a difference between the first travel resistance and the second travel resistance is calculated. If ΔF is less than a predetermined value, the flow is terminated. If ΔF is equal to or larger than the predetermined value, it is then determined, in S42, whether the sign differs between the difference made during acceleration and that made during deceleration. If the sign is different, the vehicle weight is changed in S43. Specifically, when the second travel resistance is smaller than the first travel resistance during acceleration, and the second travel resistance is greater than the first travel resistance during deceleration, an adjustment is made so as to reduce the vehicle weight. In the opposite case, an adjustment is made so as to increase the vehicle weight. A specific section for adjustment is not separately provided. During a single trip, the estimated values of the vehicle weight are averaged by using an equation similar to that described above, under the weighted average method, and the average value is constantly used:

$$Wt = Wt \times \beta + Wt \times (1-\beta)$$

where the following holds, $\beta \ll 1$.

In S44, it is determined whether the amount of change of ΔF per unit time is within a predetermined value. If the amount of change is within the predetermined value, the process proceeds to S46. If the amount of change is equal to or larger than the predetermined value, that is, in the case of a sudden change in ΔF, the process proceeds to S45, and an adjustment is made to the value of gradient resistance. It should be noted that the unit time can be changed according to the vehicle speed in S44, in such a manner that as the vehicle speed increases, the unit time decreases.

Regarding the section for adjusting the value of gradient resistance, a value corresponding to the difference may be added for the entire prediction section. Alternatively, the section for adjustment may be set to extend to the next changing point of the gradient on a map. It should be noted that it is desirable to calculate a gradient amount that causes a difference in gradient resistance, store the calculated amount in the map, and use the value at the next traveling.

In S46, it is determined whether the difference fluctuates depending on a traveling direction. If the difference is maximized in a specific traveling direction, and is minimized in a direction different therefrom by 180 degrees, it is determined that travel resistance fluctuates due to wind, and accordingly, air resistance is adjusted in S47. Specifically, a wind speed and a wind direction are calculated. Then, air resistance to which an own vehicle is subjected is calculated along a route, from the relationship between the traveling direction of the own vehicle and the wind direction on a scheduled route to travel.

Finally, if there still remains a difference, it is determined, in S48, whether own vehicle speed is equal to or higher than a predetermined value, or lower than the predetermined value. If the own vehicle speed is equal to or higher than the predetermined value, an air resistance coefficient (specifically, the product of air density, a Cd value, and vehicle front surface area) is adjusted in S49. The weighted average of the air resistance coefficient is calculated while being weighted in a manner similar to that of the vehicle weight. If the own vehicle speed is lower than the predetermined value, rolling resistance is adjusted in S50. Similarly to the vehicle weight and the air resistance coefficient, the weighted average of the rolling resistance is calculated to obtain an average value not affected by noise and the like.

A method of controlling coasting will be described with reference to FIG. 16. Depending on the type of travel resistance factor that is a cause of ΔF, the influence of ΔF on subsequent vehicle behavior changes. For example, if the vehicle weight is heavier than expected, the vehicle cannot be easily accelerated or decelerated. Therefore, when the vehicle weight is heavy, coasting is started and ended earlier than in the case where no adjustment is made to the vehicle weight. Furthermore, only an engine is started prior to the timing of generation of driving force, so as to perform a preliminary start-up with a clutch disengaged. As a result, necessary driving force can be generated without delay. Meanwhile, in the case where an adjustment is made in a manner to regard the gradient as a rising gradient, where it is estimated that the wind is blowing against the vehicle, and where an adjustment is made so as to increase an air resistance coefficient or rolling resistance coefficient, the vehicle cannot be easily accelerated, but can be easily decelerated. Therefore, the start of coasting is delayed, and coasting is ended earlier as in the case where an adjustment is made so as to increase the vehicle weight.

Seventh Embodiment

Exception processing for travel resistance calculation according to the sixth embodiment will be described. First, adjustment of vehicle weight will be described. Changes in luggage or the number of passengers may have occurred before a vehicle is restarted after being stopped or an ignition switch is turned on. Therefore, a previous value is stored. When a significant difference from the previous value is found, that is, a difference between the difference made during acceleration and that made during deceleration is found again, a small weight is assigned to the previous value, and relatively large weights are assigned to the current and subsequent values. As a result, changes in the vehicle weight are quickly addressed.

Subsequently, gradient adjustment will be described. Assume that road surface conditions are acquired with a camera or the like, and a sudden change in the road surface due to entering a gravel road or a puddle of water can be detected. In such a case, no gradient adjustment is made for a sudden change in ΔF that has occurred at substantially the same timing as entering the road surface.

With regard to wind adjustment, the density of obstacles such as buildings around the route is determined by a camera. Especially in a place where the density of obstacles on the windward side is high, the estimated value of wind speed is multiplied by a coefficient of 1 or less, which is inversely proportional to the density, width, or height of obstacles. Information on obstacles may be constantly acquired by a camera or the like during traveling. Alternatively, information acquired during the previous traveling on the road may be stored in a map held by an own vehicle or a map on the cloud side, and be used for the next traveling.

In the case where a difference occurs when a vehicle is restarted after being stopped or an ignition switch is turned on, an air resistance coefficient is recalculated to obtain a revised value while a small weight is assigned to a previous value. As a result, it is possible to quickly adapt to changes, for example, in the case of placing luggage on a roof.

Regarding rolling resistance as well, recalculation is performed to obtain a revised value while a small weight is assigned to a previous value, in the case where a difference occurs when the vehicle is restarted after being stopped or the ignition switch is turned on. As a result, it is possible to quickly address changes in the rolling resistance coefficient due to, for example, supplementation of the air pressure in a tire. If a change in the rolling resistance coefficient occurs regardless of whether the vehicle is stopped, or the ignition switch is turned off/on, rolling resistance coefficients before and after the change are recorded in the map. The record in the map is compared with the difference during the next traveling. If the value of the difference in the map is close to the current value of the difference, it is determined that the difference is due to rolling resistance unique to the place (depending on, for example, types of material covering the road surface). The value of rolling resistance is updated in the map, accordingly. Furthermore, an estimated value of rolling resistance coefficient is separately calculated and stored as a rainy weather value until an event as a ground for determination comes to an end in the following case: wipers are moving; it is confirmed, from the camera or the like, that the road surface is wet; or it is determined that rainfall has occurred in a traveling area, by road-to-vehicle communication, or the like.

It should be noted that as elapsed time from the previous traveling until the vehicle is restarted after being stopped or the ignition switch is turned on increases, estimation of each travel resistance factor needs to be avoided for a longer time from the start of traveling. This eliminates the effect of a change in travel resistance due to a change in the temperature of tires.

With these configurations, the accuracy of estimating travel resistance can be improved.

Eighth Embodiment

Described below is a method of acquiring a travel record of another vehicle by using C2X communication, in obtaining second travel resistance. Each vehicle transmits estimated travel resistance itself to vehicles around an own vehicle, or stores the estimated travel resistance on the cloud by using a roadside communication device, or the like. Alternatively, if a communication network has sufficient capacity, each vehicle transmits various information to vehicles around the own vehicle, or stores the various information on the cloud by using a roadside communication device, or the like. Examples of the various information include a traveling direction, vehicle speed, the occurrence or non-occurrence of a tire slip, sensor accuracy, and the frequency of travel resistance adjustment which can be an indicator of the accuracy of estimating travel resistance of the vehicle. On the basis of the information, an ECU of the own vehicle or a computer managing the cloud calculates an average of travel resistance estimated values. The value is used as second travel resistance for adjusting first travel resistance. It should be noted that when calculating the second travel resistance, it is possible to adopt, instead of a simple average, a weighted average calculated while large weights are assigned to information on the own vehicle and a vehicle close to the own vehicle, and to travel resistance estimated by a vehicle with high sensor accuracy or high estimation accuracy.

With the configuration, it is possible to compare the first and second travel resistance even in a state where the own vehicle is not traveling at all. Accordingly, it is possible to achieve vehicle control for more efficiently improving fuel efficiency by reducing travel time in a state where the accuracy of predicting travel resistance is low.

Ninth Embodiment

Although the present embodiment is limited to coasting, the present travel resistance adjustment result may be used for, for example, calculating engine driving force or calculating braking force at the time of applying an emergency brake.

REFERENCE SIGNS LIST 301 control device
302 automatic transmission
303 driving wheel
304 engine
305 torque converter
306 clutch

The invention claimed is:

1. A vehicle control device comprising:
a first travel resistance acquisition unit that acquires a first travel resistance, which is determined on a basis of road information or external information; and
a second travel resistance acquisition unit that acquires a second travel resistance, which is determined on a basis of a result of actual traveling of a vehicle, wherein
content of coasting travel control during traveling of the vehicle is determined on a basis of a result of a comparison of the first travel resistance and the second travel resistance in a predetermined zone where the vehicle has actually traveled, and
the content of coasting travel control includes control to be performed in such a manner that when the second travel resistance is smaller than the first travel resistance, coasting travel start timing precedes coasting travel start timing calculated from the first travel resistance, and when the second travel resistance is larger than the first travel resistance, the coasting travel start timing is delayed.

2. The vehicle control device according to claim 1, wherein the content of coasting travel control includes at least one of a stop of fuel injection, disengagement and engagement of a clutch, and a transmission gear ratio.

3. The vehicle control device according to claim 1, wherein information on at least one of a planimetric feature requiring deceleration, upper/lower limit speed, vehicle speed of a preceding vehicle, and distance between vehicles is used in planning the content of coasting travel control.

4. The vehicle control device according to claim 1, wherein the content of coasting travel control includes control to be performed in such a manner that a third coasting travel plan is created on a basis of a first coasting travel plan created from the first travel resistance and a second coasting travel plan created from the second travel resistance, and the vehicle is controlled on a basis of the plan.

5. The vehicle control device according to claim 1, wherein travel resistance calculated by another vehicle is used in acquiring the second travel resistance.

6. The vehicle control device according to claim 1, wherein the second travel resistance to be compared with the first travel resistance is calculated while a larger weight is assigned to travel resistance during coasting, which is closer in terms of time in a time series of the second travel resistance within a predetermined period of time.

7. The vehicle control device according to claim 1, wherein when the vehicle is a hybrid vehicle, a weight is assigned in calculating the second travel resistance, in order of coasting, traveling while being powered only by a motor, and driving an engine.

8. The vehicle control device according to claim 1, wherein when the vehicle is a hybrid vehicle, and has performed no coasting for a period of time equal to or exceeding a predetermined period of time, or for a distance equal to or exceeding a predetermined distance, the vehicle performs traveling while being powered only by a motor before performing coasting on a basis of the first or third travel plan.

9. The vehicle control device according to claim 1, wherein in a place where correction of travel resistance is frequently made, an engine is maintained at idle rotation at a time of coasting.

* * * * *